United States Patent [19]

Trevithick

[11] 4,237,497

[45] Dec. 2, 1980

[54] PROGRAMMABLE MULTI-CHANNEL AUDIO PLAYBACK SYSTEM

[76] Inventor: Richard W. Trevithick, 1730 E. Woodside Dr., Salt Lake City, Utah 84117

[21] Appl. No.: 932,781

[22] Filed: Aug. 11, 1978

[51] Int. Cl.³ .................. G11B 15/16; G11B 15/52; G11B 27/22
[52] U.S. Cl. ..................... 360/72.1; 179/100.1 PS; 360/71; 360/74.1
[58] Field of Search .................. 360/72, 74, 71, 73, 360/78, 72.1, 72.2, 74.1, 74.4, 74.7; 179/100.1 VC, 100.1 PS, 100.1 C

[56] References Cited

U.S. PATENT DOCUMENTS

| | | | |
|---|---|---|---|
| 3,727,203 | 4/1973 | Crossman | 360/72 |
| 3,804,993 | 4/1974 | Honnold et al. | 179/100.1 PS |
| 3,893,177 | 7/1975 | Takenaka | 360/72 |
| 4,000,518 | 12/1976 | Stearns | 360/72 |
| 4,014,039 | 3/1977 | Yasunaga | 360/74 |
| 4,032,897 | 6/1977 | Pooley | 360/72 |
| 4,135,058 | 1/1979 | Pfost et al. | 360/72 |

OTHER PUBLICATIONS

L. C. Hobbs, Low Cost Tape Devices, Computer Magazine, pp. 21-29, Mar. 1976.

Primary Examiner—Alfred H. Eddleman
Attorney, Agent, or Firm—Thorpe, North & Gold

[57] ABSTRACT

A programmable multi-channel audio playback system includes a tape having recorded thereon a plurality of segments of information on multiple channels, with the segments being separated by gaps containing no information, control apparatus for causing the tapes to move and for controlling such movement, reading apparatus for reading the information segments from the tape as the tape is moved, speaker apparatus for producing audio sounds from the information segments read by the reading apparatus, a microprocessor responsive to input signals for signalling the control apparatus to control movement of the tape and for signalling the speaker apparatus to control production of the audio sounds, and a manually operable keyboard for generating input signals which are supplied to the microprocessor. By keying certain information on the keyboard, the microprocessor is programmed to cause the reading from the tape of selected information segments and the production of audio sounds therefrom. The information segments may be read from the tape in any order desired and only selected information segments need be read.

12 Claims, 6 Drawing Figures

| CHANNEL NUMBER | 12A | 12A | 12A | 12B | 12B | 12B | 12C | 12C | 12D | 12D |
|---|---|---|---|---|---|---|---|---|---|---|
| SEGMENT NUMBER | 1 | 2 | 3 | 4 | 5 | 6 | 7 | 8 | 9 | 10 |
| PRECEEDING GAP NUMBER | 2 | 5 | 10 | 1 | 7 | 9 | 3 | 8 | 4 | 6 |
| FOLLOWING GAP NUMBER | 5 | 10 | 1 | 7 | 9 | 3 | 8 | 4 | 6 | 11 |
| STARTING CHANNEL | 1 | 1 | 1 | 2 | 2 | 2 | 3 | 3 | 4 | 4 |
| SEQUENCE POSITION ON CHANNEL | 1 | 2 | 3 | 1 | 2 | 3 | 1 | 2 | 1 | 2 |

PROGRAMMABLE MULTI-CHANNEL AUDIO PLAYBACK SYSTEM

BACKGROUND OF THE INVENTION

This invention relates to a multi-track audio playback system having manual controls by which a user may select for playback particular information segments stored on the recording medium of the system.

Commercially available multi-channel tape systems, such as are presently used in the home or installed in automobiles, play the musical numbers recorded on the tapes in the sequence in which the numbers are recorded unless the "change" or "select" button or knob is depressed. When such a button is depressed, the tape system moves from one channel to the next adjacent channel and commences to play back the musical selection located on the adjacent channel. Of course, when the tape system moves from one channel to another, it may commence playback of a selection in the middle, end, etc., of the selection. Some tape systems also provide a "fast forward" capability, but there is no way of knowing where the beginning and ending of a musical selection is—and so finding a particular desired musical number requires simple "trial and error" attempts using the "select" and "fast forward" buttons.

A number of so-called automatic tape selection systems have been proposed including that described in U.S. Pat. No. 4,014,039. In this system, programs are recorded on tapes so that a "silent" portion is located between each program. A keyboard panel is provided for supplying a desired number to a down counter which then counts downwardly from that number each time a silent portion on the tape is encountered during the fast forward movement of the tape. After a certain number of such silent portions are counted so that the downcounter reaches zero, the tape drive is stopped or returned to its normal playback speed so that the next program on the tape will be played. Of course, each time a user desires to skip some of the programs, he must key in an appropriate number and then cause the tape to move in the fast forward mode. That is, user intervention is required for each program that the user desires to hear out of order.

A type of automated audio tape information system is also disclosed in U.S. Pat. No. 3,804,993. In this system, a plurality of message segments are recorded on a tape with each message segment being separated by so-called markers and address information. When a particular message segment is to be played back, appropriate address input information is supplied and the system locates and reproduces the desired message segment. After the segment is reproduced, the tape recorder is stopped to allow the operator to take one of several actions. Again, this system requires operator intervention for each message segment which is to be reproduced out of order.

SUMMARY OF THE INVENTION

It is an object of the invention to provide a multi-channel audio playback system in which certain ones of a plurality of programs recorded on a recording medium may be chosen for playback by the user and then such programs will be automatically played (and replayed) without further intervention by the user.

It is another object of the invention to provide such a system in which, upon keying into the system certain information, the programs may be played back in any sequence desired by the user.

It is an additional object of the invention to provide such a system in which conventional multi-track tapes may be utilized.

It is a further object of the invention to provide a relatively simple and inexpensive audio playback system which may be manually programmed to automatically play back only selected programs recorded on a multi-track tape.

The above and other objects of the invention are realized in one embodiment thereof which includes a recording medium on which are serially recorded a plurality of information segments, with "silent" gaps positioned between the segments. Also included is recording medium control and drive apparatus responsive to control signals for causing and controlling movement of the recording medium, reading apparatus for reading the information segments from the recording medium and for applying such information to an audio speaker system, a microprocessor for producing control signals for application to the recording medium drive and control apparatus and for signalling the speaker system to control audio reproduction of the information segments, and a keyboard device on which a user may manually key information identifying which information segments he desires to hear and the order in which he desires to hear the segments. The keyed information is received by the microprocessor which responds by producing control signals to indicate to the recording medium control and drive apparatus the manner in which the recording medium is to be moved to locate the selected information segments. Control signals are also produced by the microprocessor to indicate to the speaker system the times during which the speaker system is to reproduce the information applied to it by the reading apparatus. The information keyed on the keyboard is maintained in storage by the microprocessor to continue control of the operation of the system until new information is keyed. That is, the selected information segments are repeatedly reproduced until new information is keyed on the keyboard directing the microprocessor to cause the reproduction of different information segments. The microprocessor may also be "programmed" to reproduce the information in any sequence desired by the user.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
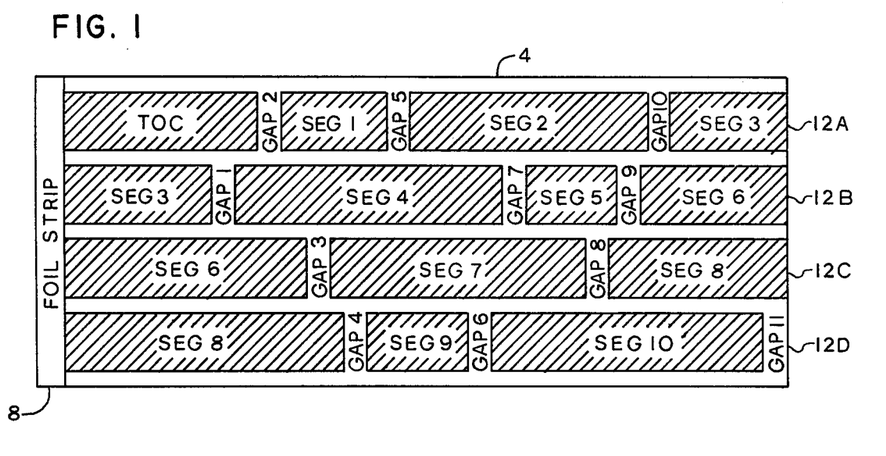
FIG. 1 is a diagrammatic showing of a multi-channel recording medium having a plurality of information segments stored thereon.

Referring to FIG. 1, there is shown diagrammatically a recording medium 4 such as a tape, having four parallel channels or tracks. Although the recording medium 4 is laid out in a linear fashion in FIG. 1, it should be understood that the left end of the medium is connected to the right end so that the medium is endless such as is provided for endless tapes. Also, for the width of the recording medium 4 shown in FIG. 1, the medium would be much longer than shown; FIG. 1 is for illustration only. A foil strip 8 is provided at one end of the recording medium 4 to indicate a beginning point for the medium. This foil strip advantageously is made of an electrically conductive material which is readily detectable by a detecting element, as will be discussed later. The foil strip 8 is provided to indicate when the end of a track or channel has been reached so that playback apparatus can change channels.

As already noted, there are four channels 12a, 12b, 12c and 12d positioned in parallel on the recording medium 4. Recorded on each channel are one or more information segments or portions of information segments. For example, on channel 12b, a portion of information segment 3, all of segments 4 and 5, and a portion of segment 6 are recorded. The information segments are recorded (and numbered in FIG. 1) in a serial fashion so that as the recording medium is "played back", the information segments would be reproduced and broadcast in consecutive order in accordance with their serial position on the recording medium. Separating each information segment is a gap in the channel in which no information is recorded. The information segments generally are of different lengths, but this of course depends upon the amount of information recorded in the segments.

The recording medium 4 of FIG. 1 includes ten information segments and eleven gaps, with the gaps being numbered in ascending order as they are encountered (regardless of which channel) moving from the left end of the recording medium to the right end. In a portion of channel 12a at the beginning thereof is recorded a table of contents (TOC) which contains information as to the location of each of the information segments, i.e., what channel or channels each information segment is located, what gap precedes and succeeds each information segment, and the sequence of positioning of the segments on each channel. This information, which is shown in table form in FIG. 2, may be recorded as multi-frequency tones which can be read and decoded into numbers representing the desired information.

Figure 2:
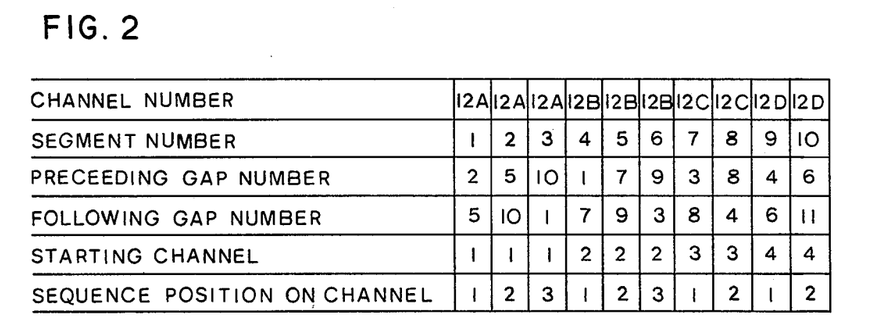
FIG. 2 is a table identifying different parameters about each information segment shown on the diagrammatic recording medium of FIG. 1.

As shown in FIG. 2, each of the four channels of the recording medium 4 of FIG. 1 are listed in the first column followed by a column showing the segment number of the segments which begin in the corresponding channel. For each segment number, the preceding gap number, following gap number, channel in which the segment begins, and sequence position on the channel are given. This will be discussed in more detail later.

Figure 3:
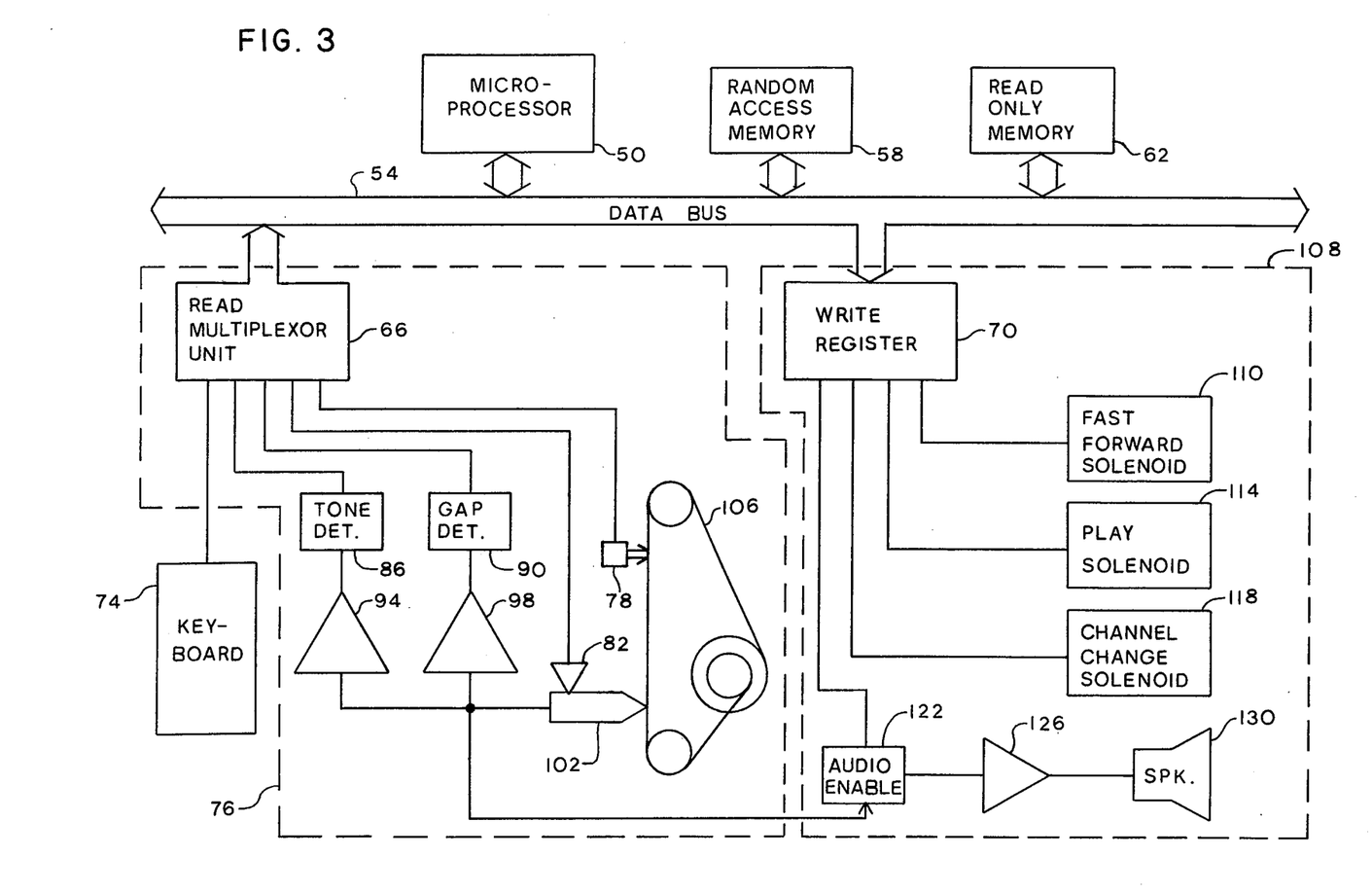
FIG. 3 is a schematic diagram of a multi-channel audio playback system made in accordance with the present invention.

FIG. 3 is a block diagram arrangement of a multichannel audio playback system made in accordance with the present invention. The system includes a microprocessor 50 which controls the operation of the other components of the system. Such control is effected by receipt of and transmission of signals over a data bus 54. Coupled to the data bus 54 is a random access memory 58 for use by the microprocessor for temporary storage of data and for storing the table of contents information shown in FIG. 2, and a read only memory 62 which contains programs for controlling system operation. The configuration of a microprocessor 50, random access memory 58, and read only memory 62 as shown is conventional. The microprocessor 50 could illustratively be a Zilog Z-80 made by Zilog Corporation.

Also coupled to the data bus 54 is a read multiplexer unit 66 and a write register 70. The read multiplexer unit 66 receives information from a plurality of different units (to be discussed hereafter), and supplies such information in a multiplexed fashion to the data bus 54 for transfer to the microprocessor 50 or the random access memory 58. The units connected to the read multiplexer unit 66 include a manually operable keyboard 74, a foil strip detector element 78, a microswitch 82, a tone detector 86 and a gap detector 90. Amplifiers 94 and 98 amplify signals received from a read head 102 for application respectively to the tone detector 86 and gap detector 90. The read head is a conventional monaural, single-channel read head which is maintained in continual contact with or close proximity to an endless tape 106. The foil strip detector 78 is maintained in constant contact with the tape. The read head 102 is positionable by a channel change solenoid 118 to read information stored on any one of a plurality of channels included on the endless tape 106. These elements are conventional for a tape player system.

The write register 70 receives information from the microprocessor 50 via the data bus 54 to control the operation of a fast foward solenoid 110, a play solenoid 114, the channel change solenoid 118, and an audio enable circuit 122. The write register could illustratively be a decoder for supplying a signal to a selected one of the solenoids or the audio enable circuit in response to data from the micrprocessor. When the fast forward solenoid 110 is signalled by the write register 70, it causes the endless tape 106 to move forward at faster than the normal speed. When the write register 70 signals the play solenoid 114, the play solenoid causes the tape 106 to move at the normal speed. When the write register 70 signals the channel change solenoid 118, the channel change solenoid, as indicated earlier, causes the read head 102 to move to the next adjacent channel on the tape. The audio enable circuit 122, when signalled by the write register 70, allows passage of signals from the read head 102 to an amplifier 126 which amplifies the signals and applies them to a speaker 130 which will reproduce the signals for listening by the user. The audio enable circuit 122 could illustratively be a transistor or similar troide control device.

In operation, when a user desires to play a particular tape such as that depicted in FIG. 1, he inserts the tape into a conventional tape receptacle so that the tape is positioned adjacent the read head 102 and the foil strip detector 78. Such a tape would contain the table of contents section earlier described in connection with FIGS. 1 and 2. When the system is turned on, i.e., when power is supplied to the microprocessor 50, it applies a signal to the write register 70 to cause the write register to operate the channel change solenoid 118. In response, the channel change solenoid causes the read head to change channels until it is positioned on the first channel (channel 12a of FIG. 1). When the read head 102 reaches the first channel, it contacts the microswitch 82 which then applies a signal to the read multiplexer unit 66 which, in turn, applies the signal to the microprocessor 50 via the data bus 54. The microprocessor 50 then signals the write register 70 to activate the fast forward solenoid 110. The fast forward solenoid causes the tape 106 to move forward in the fast-forward mode until the foil strip located on the tape is detected by the foil strip detector 78. When this occurs, the foil strip detector applies a signal to the read multiplexer unit 66 which in turn applies it to the microprocessor 50. The microprocessor then applies a signal to the write register 70 to activate the play solenoid 114. The play solenoid, in turn, causes the tape 106 to move in its normal mode and the read head 102 reads the information stored in the table of contents segment on the tape which, as indicated earlier, consists of different combinations of tones. This information is applied by the read head 102 to the amplifier 94 which amplifies the signals for application to the tone detector 86. The tone detector 86 then produces a sequence of signals representing the detected tones for application to the read multiplexer unit 66. These signals are then applied to the data bus and stored in the random access memory 58. After reading out the table of contents from the tape, the read head 102 encounters gap 2 on channel 1, and this is detected by the gap detector 90 which accordingly signals the read multiplexer unit 66. The read multiplexer unit 66 applies this signal to the data bus 54 and to the microprocessor 50 which then signals the write register 70 to deactivate the play solenoid 114. The movement of the tape is thus halted at gap 2 in channel 1. The system is now in condition for being "programmed" by the user to play the selected information segments.

The user keys in on the keyboard 74 an indication of the information segments which he desires to have played back. The keyboard 74 could be a conventional push button type keyboard in which a different signal is applied to the read multiplexer unit 66 for each key depressed. Each of the keys on the keyboard would be used to identify a different one of the information segments on a tape so that when any key was pushed, a signal would be applied to the multiplexer unit 66 and then to the microprocessor 50 to indicate that that information segment is to be played.

Assume that a user has keyed in information indicating that he desires to play segments 1, 2, 5 and 6. These information segments may be played back in numerical sequence, in the sequence in which the keys representing the different information segments are depressed, or in a sequence which would minimize the number of tape revolutions necessary to play all of the segments. If it is desired to play the segments in numerical sequence (i.e., 1, 2, 5 and 6), then the microprocessor 50 simply plays back each segment beginning with segment 1 and at the end of playback of a segment, determines the channel and the number of gaps to count to reach the next segment. The information as to the number of gaps to count and the channel on which the segment is located can be computed from the table of contents which is already stored in random access memory 58. Thus, for the segments in question, segment 1 would be played followed by segment 2, after which the read head 102 would be positioned at gap 10 following segment 2. To reach segment 5, the read head would be moved to channel 2 (identified as 12b) and the tape would be moved in the fast forward mode until gap 7 on the channel was encountered. Segment 5 would then be read from the tape until gap 9 were reached. Segment 6, since it follows segment 5, would next be played back after which the read head would be positioned at gap 3 following segment 6 in channel 3.

Since, upon programming the system to play a particular group of information segments, the system continues to play such segments until "reprogrammed", after segment 6 were read back, the system would next return to the beginning of segment 1. This would be done by changing the channel in which the read head was located and operating the system in the fast forward mode during which time the gaps would be counted to ascertain when gap 2 in channel 1 was reached. After this occurred, the tape would be moved in the "play" mode to play back segment 1, etc.

If the segments are to be played back in the sequence in which the corresponding keys are depressed, then the microprocessor simply stores information identifying this sequence in the same fashion that it would search in numerical sequence.

It is also possible for the microprocessor 50 to play back the segments in the order which would require the least number of tape revolutions to complete one playback of all of these selected segments. Determining the sequence to play back the segments to minimize the number of tape revolutions can be accomplished by conventional operation research techniques using the table of contents stored in the random access memory.

Once a segment is selected as the next segment to be played (regardless of which sequence the segments are being played back), the following method may be used to locate such segment. Upon power-up of the system, the read head is switched to channel one (12a) and the tape is moved in the fast forward mode until the foil strip is reached. The tape is then moved at the "play" speed to read the table of contents, after which the tape is stopped at the gap following the table of contents. This gap location following the table of contents will always be the same as the gap preceding segment 1 (for the FIG. 1 recording medium, this gap is gap 2).

Next, determine if the current gap number is greater than the preceding gap number of the desired segment (i.e., determine if it is necessary to pass the foil strip to locate the desired segment), and if it is, move the tape in the fast forward mode to the foil strip and use O as the present gap location. If it is not, do not move the tape. Assume, for illustration, that the desired segment is segment 5. In this case, the present gap location of 2 is not greater than gap 7 which is the preceding gap number for segment 5, so the tape would not be moved.

Now position the read head on the channel on which the desired segment beings (i.e., channel 12b for the desired segment 5). Next, determine how many silient spaced (gaps) must be skipped to reach the desired segment. This is done by counting the number of segments of the desired channel whose preceding gap number is both greater than the current gap number and less than or equal to the preceding gap number of the desired segment. In our case, the calculation yields "1".

Now, move the tape in the fast forward mode until the number of gaps calculated in the previous step have been encountered. In the present example, only one gap (gap number 7) would be counted.

The segment may now be played back. Following playback, the above described procedure would be used to locate the next segment to be played.

Figure 4:
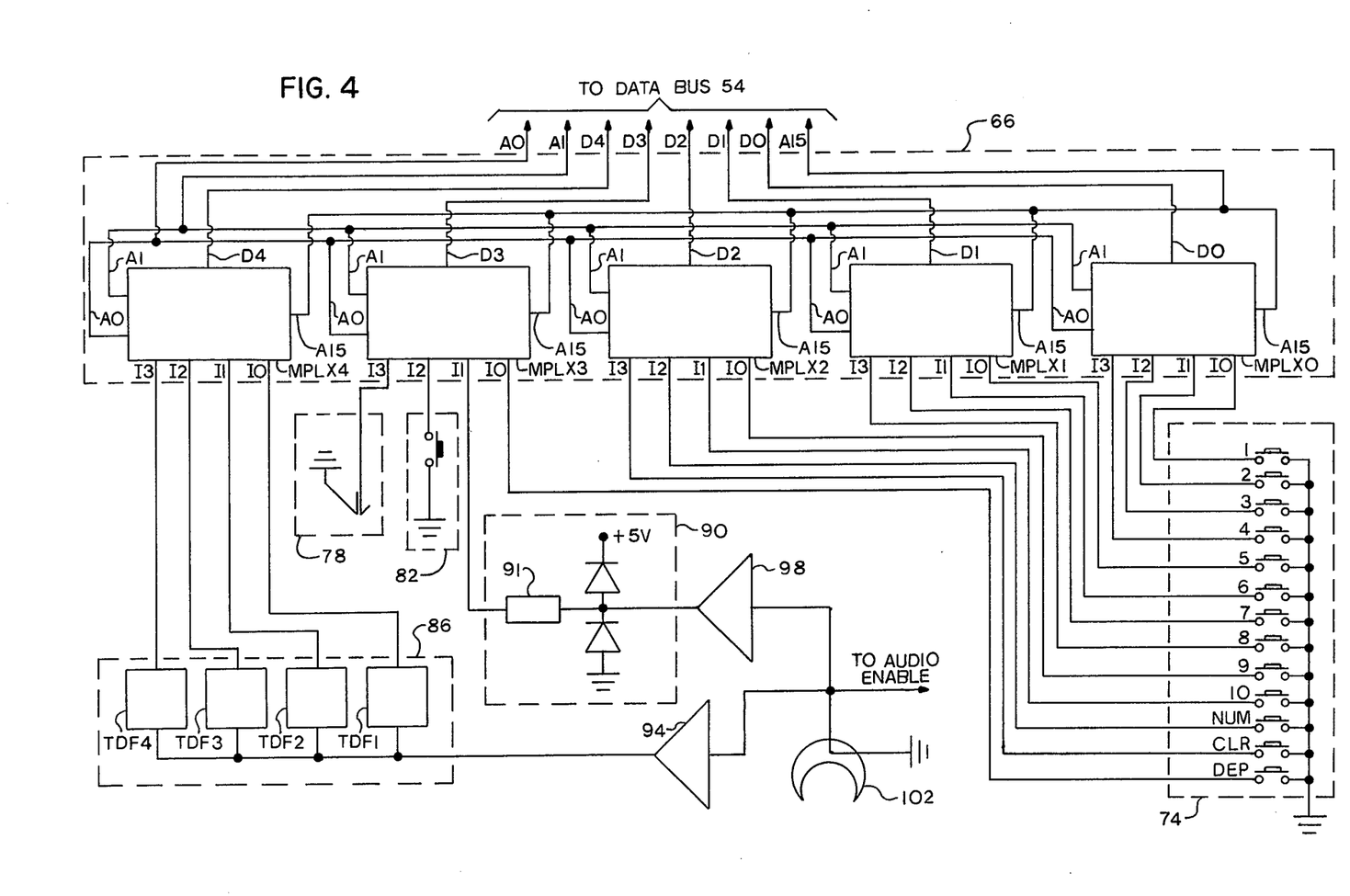
FIG. 4 is a circuit diagram of the keyboard 74 and block 76 shown in FIG. 3.

FIG. 4 shows specific circuitry for the keyboard 74 and read apparatus block 76 of FIG. 3. The read multiplexer unit 66 of this circuitry includes five 4-to-1 multiplexers MPLX 0, MPLX 1, MPLX 2, MPLX 3 and MPLX 4. Each of these multiplexers is connected to four different elements of the rest of the circuitry, and to the data bus 54. In response to identification signals and an enable signal received from the microprocessor 50 over the data bus, and in particular over leads $A_0$, $A_1$, and $A_{15}$, respectively, each multiplexer applies to its output lead ($D_0$, $D_1$, $D_2$, $D_3$ and $D_4$) the signal present on a particular one of its input leads $I_0$, $I_1$, $I_2$ or $I_3$ specified by the signals on leads $A_0$ and $A_1$. That is, the microprocessor 50 signals the multiplexers MPLX 0 through MPLX 4 over leads $A_0$ and $A_1$ to successively apply the signals present on the input leads $I_0$, $I_1$, $I_2$ and $I_3$ to the respective output leads $D_0$ through $D_4$. The signals applied to these output leads are received and processed by the microprocessor.

Coupled to the multiplexer MPLX 4 to different ones of the input leads $I_0$ through $I_3$ are four tone detectors TDF 1, TDF 2, TDF 3 and TDF 4, each of which produces an output signal when a tone having a certain frequency is supplied by amplifier 94. These tones, which are recorded in parallel on tape, are detected by the read head 102 and supplied to the amplifier 94.

The gap detector 90 includes a Schmitt trigger 91 which is coupled to the output of the amplifier 98. The Schmitt trigger 91 remains in one state so long as its input from amplifier 98 is below the threshhold level of the trigger. However, the Schmitt trigger 91 changes between two states continuously when the input from amplifier 98 is above the threshhold level of the trigger, i.e., when information is being read from the tape. The output signal from Schmitt trigger 91 is supplied to the multiplexer MPLX 3 and ultimately to the microprocessor. Thus, the microprocessor determines that a gap has been encountered when the Schmitt trigger remains in one state for a predetermined length of time. The microprocessor simply times over the predetermined time period, and if the Schmitt trigger does not change states during that period, it is assumed that a gap has been detected. Of course, the time period for the fast forward mode would be different from that for the play mode.

Diodes $D_1$ and $D_2$ are provided in the gap detector 90 to protect the Schmitt trigger against excessive positive or negative signals produced by the amplifier 98.

The keyboard 74 includes ten selection keys numbered 1 through 10, each for identifying a corresponding information segment on a tape, one key labeled "NUM" which is depressed when a user desires to have the information segments played back in the numerical order of the segments, one key labeled "DEP" which is depressed when a user desired to have the information segments played back in the order of depression of the selection keys, and a key labeled "CLR" which is used to signal the microprocessor to clear the keyboard information presently stored in memory. If only the selection keys are depressed (i.e., neither the "NUM" nor "DEP" key is depressed), the microprocessor will cause playback of the information segments in the sequence which will tend to minimize the tape movement required to complete playback of the selected segments. For example, assume that a user has selected segments 1, 2, 5 and 6 for playback. Three complete tape revolutions are necessary to play back these segments in numerical sequence and return to the staring point, but only two revolutions are necessary if played in the order 1, 5, 6, 2. Conventional operation research techniques, as before mentioned, may be utilized to produce a procedure for minimizing the number of tape revolutions.

Figure 5:
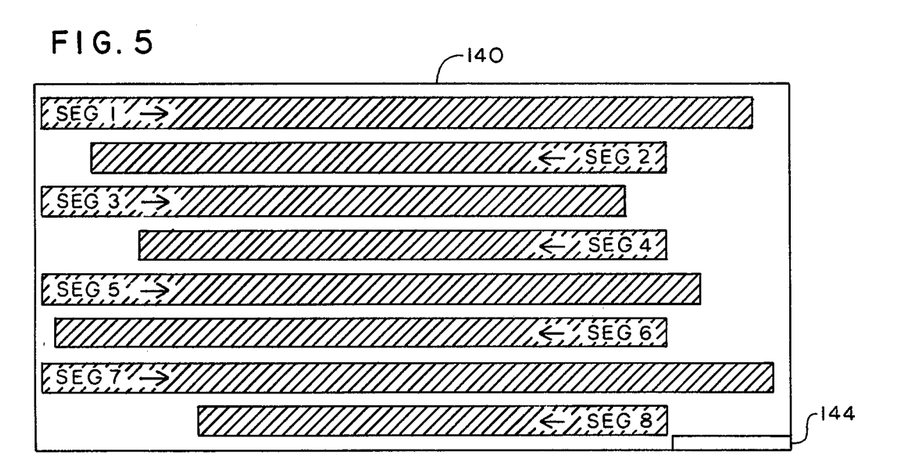
FIG. 5 is a diagrammatic showing of another multi-channel recording medium having a plurality of information segments stored thereon.

FIG. 5 shows an alternative arrangement of a recording medium 140 in which eight information segments are recorded each on a different channel or track. This recording medium is "end-to-end", rather than endless as with the FIG. 1 recording medium, with the odd numbered segments beginning near the left end of the medium and the even numbered segments beginning at a fixed distance from the right end. The direction of playback for the segments is indicated by the arrows superimposed on the segments. As seen, the odd segments are played back by moving the medium in one direction and the even segments are played back by moving the medium in the opposite direction.

A foil strip 144 for detecting the right end of the medium is located in the lower right hand corner.

The arrangement of information segments on the recording medium 140 does not allow for as compact of storage as the arrangement shown in FIG. 1, but the segments and beginning points of segments are readily locatable for the FIG. 5 medium.

Figure 6:
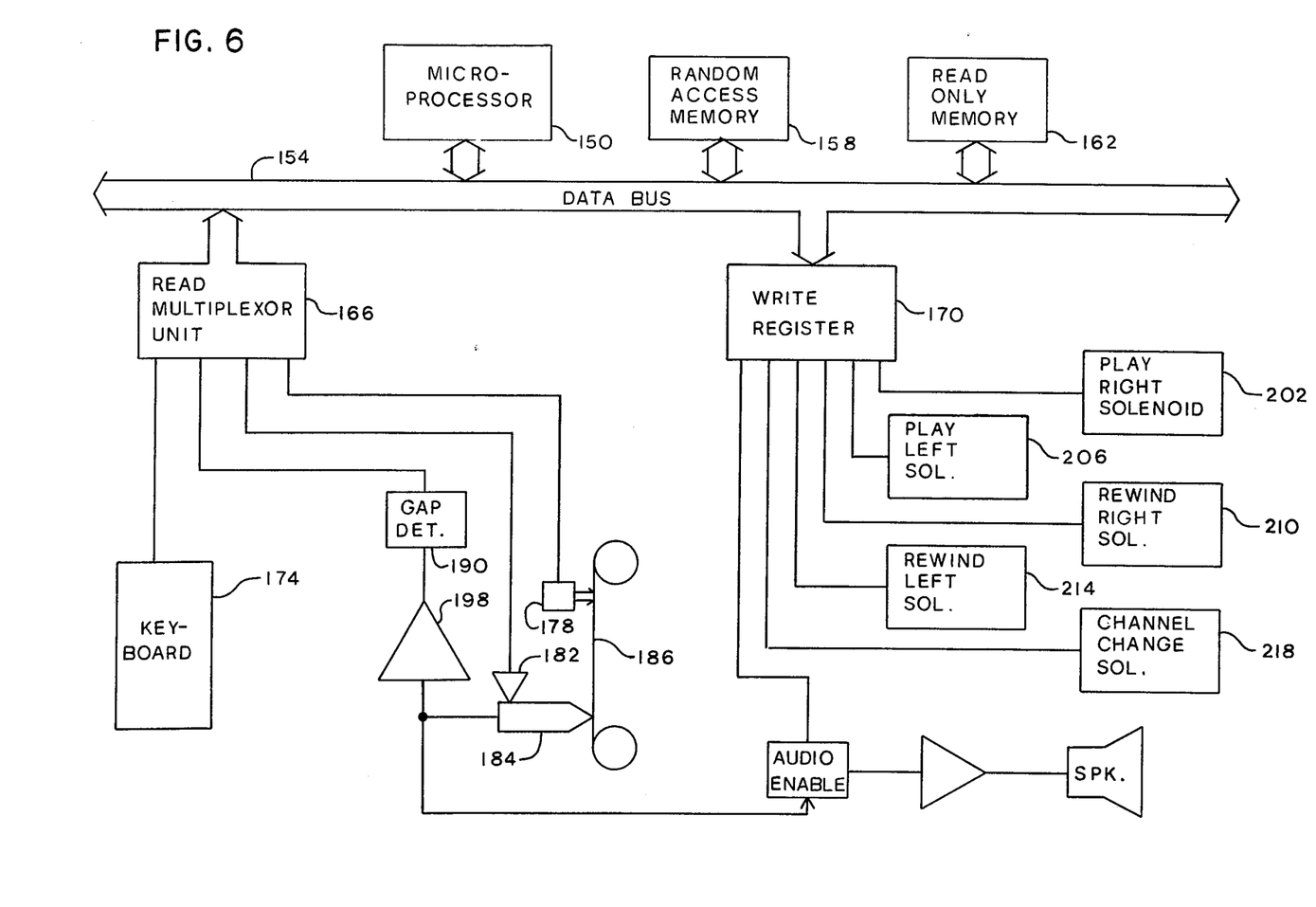
FIG. 6 is a schematic diagram of a playback system for playing back information from a recording medium of the type shown in FIG. 5.

FIG. 6 shows an exemplary audio playback system on which the recording medium of FIG. 5 could be used. Many of the components are the same as those of FIG. 3 system with the following exceptions: additional solenoids are provided in the FIG. 6 arrangement and no tone detector is provided in this arrangement.

As with the FIG. 3 system, a microprocessor 150 controls the operation of the other components of the system through receipt of and transmission of signals over a data bus 154, and pursuant to programs contained in a read only memory 162. A random access memory 158 is provided for the temporary storage of information by the microprocessor 150. The other components of the FIG. 6 system will be discussed when describing the operation of the system.

When a tape 186 is placed in the receptacle of the system and the power is turned on, the microprocessor 150 signals a channel change solenoid 218 via a write register 170 to move a read head 184 to channel one or segment 1 of the tape 186 (also see FIG. 5). Positioning of the read head 184 on channel one is detected by a microswitch 182, as in the FIG. 3 system, which signals the microprocessor 150 via a read multiplexer unit 166.

The desired segments to be played back may then be selected by appropriate keying of a keyboard 174. This keyboard is similar to that described earlier in connection with FIG. 4. The keyed information is supplied via the read multiplexer unit 166 to the microprocessor 150. In response, the microprocessor 150 signals the channel change solenoid 218 to cause the read head 184 to move to the channel containing the segment to be first played. If this is an odd numbered segment, the microprocessor 150 signals a rewind left solenoid 214 to cause the tape 186 to rewind left to the end of the tape so that the read head 184 will be positioned at the beginning of the desired segment. If the desired segment is an even numbered segment, then the microprocessor 150 signals a rewind right solenoid 210 to cause the tape 186 to rewind right until the foil strip 144 is detected by a foil strip detector 178, at which time the tape is stopped. After appropriate positioning of the tape 186, the microprocessor 150 signals either a play right solenoid 202 (if the segment to be played is odd numbered) or a play left solenoid 206 (if the segment to be played is even numbered) to cause the tape 186 to move so that the selected segment is played back. Reproduction of the audio information is carried out the same as described for FIG. 3.

After playback of the segment, the gap following the segment is detected and the tape 186 is stopped by signaling whichever one of the play solenoid had been activated. If the microprocessor 150 has been programmed by appropriate keying on the keyboard 174 to play the chosen segments in a certain sequence, then the microprocessor 150 signals the channel change solenoid 218 to cause the read head 184 to move to the channel containing the next segment in the sequence. The previously descried steps are then repeated to playback this segment, etc.

If the microprocessor has been programmed to play the chosen segments in the fastest sequence, then the channel change solenoid 218 is signaled by the microprocessor 150 to cause the read head 184 to move to the closest opposite numbered channel or segment of those to be played back. By doing this, no rewinding is necessary in order to play the next segment and, of course, this saves time in playing back the desired segments. This would continue insofar as possible so that the segments are played back in that sequence which would require the fewest rewinds. As with the previous embodiment, the chosen segments are replayed until the microprocessor is reprogrammed.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A programmable multi-channel audio playback system for tape decks and the like comprising record means having a multiplicity of channels on which segments or portions of segments of information are serially recorded, each serially adjacent pair of segments being separated by a numbered gap, wherein said record means has recorded thereon a table of contents which includes information identifying each segment of information recorded on the record means, information identifying the number of the gaps preceding each segment of information, information identifying which channel each segment of information begins on, and information indicating what sequence position, from a common position on the record means, each segment of information occupies on the channel on which said each segment begins, control means for causing the record means to move and for controlling such movement in response to control signals, reading means for reading said information segments and said table of contents from the record means as the record means is moved, channel select means responsive to control signals for causing said reading means to read from selected channels on said record means, means coupled to said reading means for producing a gap indication signal when said reading means encounters a gap on said record means, audio speaker means for aurally reproducing information segments applied thereto when activated by an activation signal, keyboard means having a plurality of manually operable keys which, when operated, cause production of key signals, said key signals identifying information segments on the record means which are to be reproduced, storage means for temporarily storing said key signals, and a microprocessor responsive to said key signals and said gap indication signals for producing control signals for application to said control means and to said channel select means to control movement of the record means and the reading of information segments by the reading means, and for producing activation signals for activating said audio speaker means.

2. An audio playback system as in claim 1 wherein said record means comprises an endless tape and includes a strip means located at a preselected beginning point on said tape, said segments of information and table of contents being recorded on said tape at locations relative to said strip means, said system further including detector means positioned adjacent said tape for producing a strip means indication signal when the detector means encounters said strip means on the tape, and means for supplying said strip means indication signal to said microprocessor.

3. An audio playback system as in claim 2 wherein said control means further includes play means responsive to control signals from said microprocessor for causing said tape to move at a playback speed in a forward direction, and fast forward means responsive to control signals from said microprocessor for causing said tape to move at a faster than playback speed in the forward direction.

4. A programmable multi-channel audio playback system for tape decks and the like comprising record means including an end-to-end tape having a multiplicity of channels and having recorded thereon one segment of information on each channel, wherein a first group of information segments located on every other channel begin near one end of the tape for playback when said tape is moved in a first direction and wherein a second group of information segments located on the remaining channels begin near the opposite end of the tape for playback when said tape is moved in a second direction opposite said first direction, control means for causing the tape to move and for controlling such movement in response to control signals, reading means for reading said information segments from the tape as the tape is moved, channel select means responsive to control signals for causing said reading means to read from selected channels on said tape means, means coupled to said reading means for producing a signal when said reading means encounters the end of an information segment on said tape, audio speaker means for aurally reproducing information segments applied thereto when activated by an activation signal, keyboard means having a plurality of manually operable keys which, when operated, cause production of key signals, said key signals identifying information segments on the tape means which are to be reproduced, storage means for temporarily storing said key signals, and a microprocessor responsive to said key signals and said end of information segment signals for producing control signals for application to said control means and to said channel select means to control movement of the tape means and the reading of information segments by the reading means, and for producing activation signals for activating said audio speaker means.

5. An audio playback system as in claim 4, wherein the information segments of said first group begin a predetermined distance from said one end of the tape wherein the information segments of said second group begin a certain distance from said other end of the tape and terminate at distances greater than said predetermined distance from said one end, and wherein the information segments of said first group terminate at distances greater than said certain distance from said other end.

6. An audio playback system as in claim 5 wherein said record means further includes a strip means located between said other end of the tape and the locations at which the information segments of said second group begin, said system further including detector means positioned adjacent said tape for producing a strip means indication signal when the detector means encounters said strip means on the tape, and means for supplying said strip means indication signal to said microprocessor.

7. An audio playback system as in claim 6 wherein said control means further includes first direction play means responsive to control signals from said microprocessor for causing said tape to move at a playback speed in said first direction, second direction play means responsive to control signals from said microprocessor for causing said tape to move at a playback speed in said second direction, first rewind means responsive to control signals from said microprocessor for causing said tape to move at a faster than playback speed in said first direction, and second rewind means responsive to control signals from said microprocessor for causing said tape to move at a faster than playback speed in said second direction.

8. A method of locating and reproducing selected information segments in an audio playback system comprising (a) providing a multi-channel recording medium having recorded thereon a plurality of numbered information segments in a serial fashion, with each serially adjacent pair of segments being separated by a numbered detectable segment delineator, and having recorded thereon a table of contents which includes indicia identifying each information segment recorded on the recording medium, data identifying the number of the gaps preceding each information segment, data identifying the channel on which each information segment begins, and data indicating what sequence position, from a common position on the recording medium, each information segment occupies on the channel on which said each segment begins, (b) keying information on a keyboard and applying such information to a microprocessor, said information identifying those desired information segments on the recording medium which are to be reproduced, (c) reading the table of contents informtion from the recording medium by a reading element and temporarily storing such information under control of the microprocessor, (d) determining from the table of contents information the identity of the channel on which the first desired information segment is located and the identity of the delineator preceding the desired information segment, (e) determining from the table of contents information the number of delineators on the identified channel from the current position of the reading element to the identified delineator, (f) moving the recording medium and positioning the reading element with respect to the recording medium, under control of the microprocessor, so that the reading element is positioned at the delineator preceding the desired information segment, and (g) activating an audio reproducing means and then moving the recording medium in the playback mode to reproduce the desired information segment.

9. A method as in claim 8 further comprising the steps of performing steps (d) through (g) for the next information segment to be reproduced.

10. A method as in claim 9 wherein step (d) comprises determining from the table of contents information the identity of the channel on which is located the lowest numbered desired information segment which has not yet been reproduced, and the identity of the gap preceding such information segment.

11. A method as in claim 9 wherein step (d) comprises determining from the table of contents information the identity of the channel on which is located the desired information segment whose identity was least recently keyed and which has not yet been reproduced, and the gap preceding such information segment.

12. A method as in claim 9 wherein, for an endless recording medium, step (d) comprises (h) determining if the number of the gap at which the reading element is currently located is greater than the number of the gap preceding the desired information segment, and (i) moving the recording medium so that the reading element is at the common position if the determination in step (h) is affirmative, otherwise not moving the recording medium.

* * * * *